United States Patent Office 3,512,340
Patented May 19, 1970

3,512,340
METHOD AND APPARATUS FOR COOLING AND HUMIDIFYING A HOT GAS FLOW
Karl Golücke, Bensberg, near Cologne, Franz Müller, Bensberg-Refrath, and Friedrich Fischer, Cologne-Sulz, Germany, assignors to Klockner-Humboldt-Deutz Aktiengesellschaft, Cologne-Deutz, Germany, a corporation of Germany
Continuation of application Ser. No. 280,787, May 16, 1963. This application Dec. 19, 1967, Ser. No. 691,911
Claims priority, application Germany, May 19, 1962, K 46,787
Int. Cl. B03c; B01d 59/50, 51/00
U.S. Cl. 55—5
9 Claims

ABSTRACT OF THE DISCLOSURE

Method of cooling and humidifying a flow of hot gas includes injecting a cooling liquid in fine distribution into a flow of hot gas at a given location along the flow path thereof, introducing a fine-granular solid substance into the flow of hot gas at a location upstream of the given location, the hot gas flow having a velocity adequate for entraining the liquid and solid so that they are in heat-exchanging relation within the gas flow, and separating the solid substance from the gas flow at a location along the flow path thereof downstream from the given location. Apparatus for carrying out the above-described method comprises a conduit through which a flow of hot gas passes when the apparatus is in operation, the conduit having a flow inlet end and a flow outlet end for the hot gas, liquid coolant supply means having an injection nozzle extending into the conduit intermediate the inlet and outlet ends thereof, means connected to the conduit at a location between the injection nozzle and the inlet end of the conduit for introducing fine-granular material at the above location into the gas flow within the conduit, and means connected to the outlet end of the conduit for separating the fine-granular material from the gas flow.

This application is a continuation of application Ser. No. 280,787, filed May 16, 1963, now abandoned.

Our invention relates to methods and means for cooling and humidifying a hot gas current by injection of water or other liquid, particularly for such purposes as improving electrostatic dust removal from the gas flow or protecting hose-type filters, blowers and other devices traversed by the hot gas flow.

In industrial heat-treating processes of solid substances, the hot gases resulting from the heat treatment are often the cause of difficulties. It is known to inject cooling liquid, particularly water, into the hot gases in order to avoid endangering blowers, hose-type filters or other devices traversed by the gas flow and to simultaneously facilitate ducting and handling of the gas. Such humidification may also be desirable for other reasons, for example, because of chemical processes, or for improving the elimination of dust in an electrostatic precipitator subsequently traversed by the gas flow. Particularly in the operation of such precipitators, it has been found that the removal of dust from hot gas is rather difficult in the temperature range between 200 and 300° C., whereas above and below this range the conditions for electric dust removal are considerably more favorable. Difficulties in electric dust precipitation from hot gases have also been encountered when the humidity content of the gases is too low. It is therefore desirable for electrostatic dust removal from hot gases to not only avoid the temperature range of 200 to 300° C. but to also increase the dew point of the gases by injecting water in fine distribution or in form of steam into the gases so that superheater steam is produced in the gases. Experience has shown that this considerably increases the dust separating efficacy of electrostatic precipitators, particularly by avoiding the so-called reverse corona discharges.

It is known to humidify hot gases with water in moistening towers or chambers. With devices of this type, however, it is virtually infeasible to fully evaporate the water introduced into the gas flow, especially if relatively large water quantities are to be added to the gas. The non-evaporated portion of the water remains preserved in form of droplets and can result in incrustation at the bottom, in conduit elbows and the like, or may cause precipitation in form of sludge that must be removed. Sludges of this type are difficult to handle because generally they cannot simply be drained off but must be dehydrated in special dehydrating equipment, such as thickening devices or centrifuges, and must subsequently be dried. Incrustations must be removed mechanically.

With all humidifying processes dealing with hot gases it has been found that the above-mentioned difficulties due to insufficient evaporation of the humidifying liquid and the retainment of liquid droplets will always occur when intensive cooling and moistening of the gases is to be effected.

It is an object of our invention to solve this problem in a simple and economical manner.

More specifically, it is an object of our invention to devise a particularly effective method for cooling and humidifying a hot gas flow by injection of water or other liquids, particularly for such purposes as improving electrostatic dust removal from the gas flow or for protection of hose-type filters, blowers and other devices traversed by the gas flow, without causing the formation of appreciable incrustation or the necessity of removal and treatment of sludge formation.

According to our invention we inject into the hot gas flow not only a fine spray of water or other liquid but also supply to the gas flow a distributed fine-granular solid substance, so that the liquid as well as the solid particles are conjointly entrained by the flowing gas. The fine-granular substance then assumes heat from the hot gas very rapidly and issues the heat to the liquid with which the solid particles travel in mutual heat exchange.

According to another feature of our invention, the introduction of the fine-granular solid substance is effected ahead of the locality where the liquid spray is injected and distributed in the gas, relative to the flow direction of the hot gas.

According to still another feature of our invention, the fine-granular solid material, after having served its above-mentioned heat-exchanging purposes along a portion of the gas travel, is separated from the hot gas flow and recycled back into the gas to again coact with the finely distributed liquid in the above-described manner. As a result, the amount of solid substance needed for the process is considerably reduced.

The method according to the invention is advantageously employed by using as fine-granular solid substance a duct material with which the hot gas flow is originally laden and which is separated therefrom. Furthermore, in the heat treatment of fine-granular raw material, for example cement raw material, this raw material itself can be introduced as fine-granular solid substance into the hot gas flow issuing from the heat processing equipment such as a rotary cement kiln, and to supply the same granular material, after separating it again from the gas flow, to the kiln or other heat processing equipment. This has the advantage that a desired preheating of the raw material takes place simultaneously with the moistening of the hot gases.

The above-mentioned and further objects, advantages and features of our invention, said features being set forth with particularity in the claims annexed hereto, will be apparent from, and will be described in, the following with reference to embodiments of apparatus for performing the method according to the invention illustrated by way of example on the accompanying drawings in which:

Figure 1:
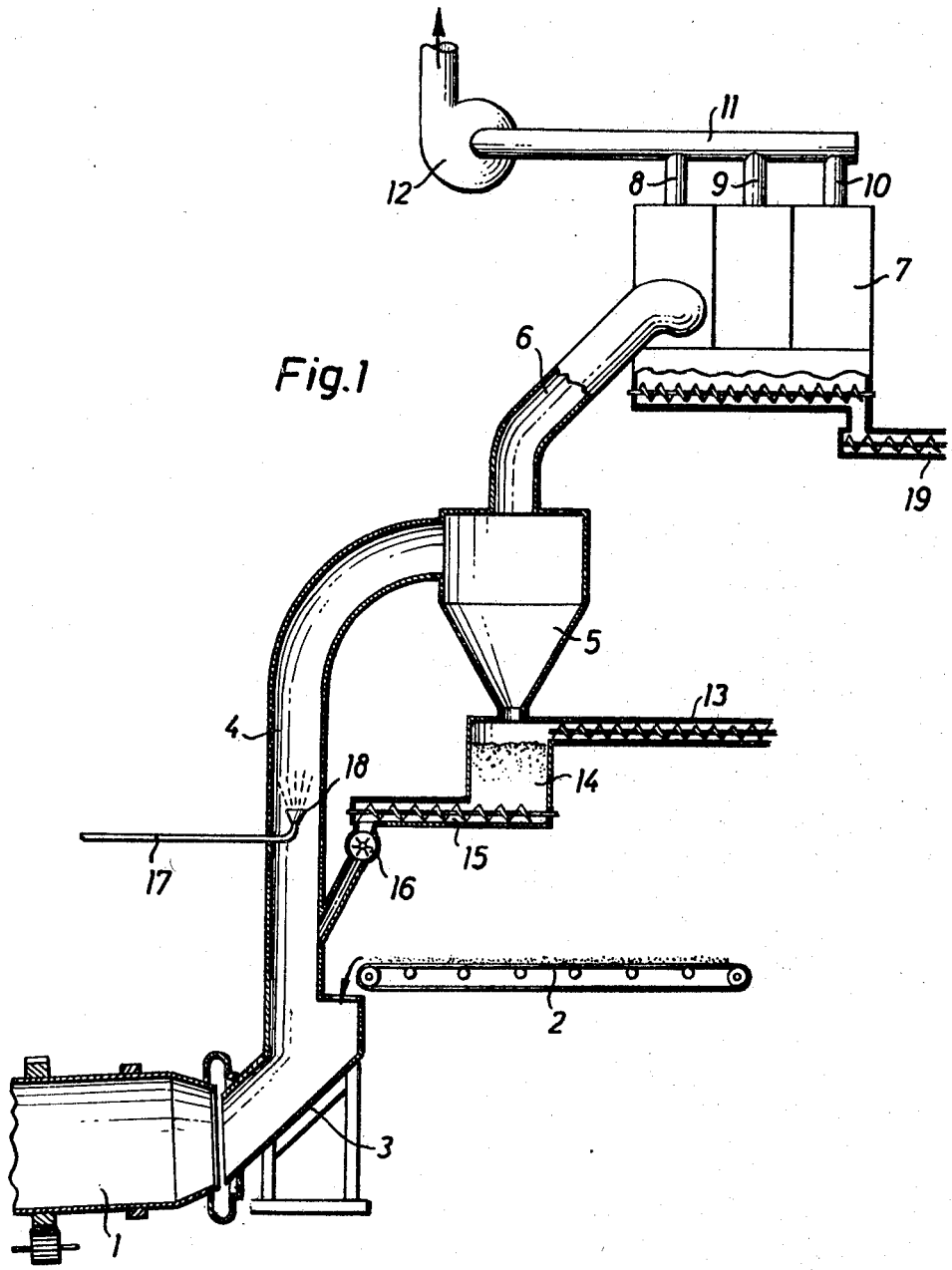
FIG. 1 shows schematically an apparatus for cooling and moistening a hot gas flow constituted by waste gases from a rotary kiln.

The apparatus shown in FIG. 1 serves to cool and humidify a hot gas flow for reducing its temperature to such an extent as to readily afford the separation of dust with the aid of hose filters. The material to be processed is supplied to a rotary kiln 1 by means of a suitable conveyor, exemplified by a conveyor belt 2 and a slide trough 3. As the material passes toward the left through the rotating kiln, it is subjected to heat treatment with the aid of a hot gas current which passes through the kiln in the opposite direction and enters into a waste-gas conduit 4 whose upper end communicates with a dust separator designed as a cyclone 5. The gas flow leaves the cyclone through an outlet conduit 6 connected to a hose-type filter 7. The cleaned gas passes from the filter hoses through conduits 8, 9 and 10 into a collector conduit 11 and is exhausted into the ambient air by a blower 12.

According to the invention, a fine-granular and substantially dry solid substance is supplied by a feed screw 13 to a storage container 14. The solid material is used in granular or pulverulent form and consists, for example, of sand, lime-stone meal or the like. From container 14 the fine-granular substance passes through a conveying and dosage-metering device, exemplified by a feed screw 15 and a cell wheel 16, into the waste-gas conduit 4. The solid granules are then entrained by the hot gas flow which passes upwardly through the conduit 4. The solid substance, thus distributed over the entire flow cross section, rapidly assumes the heat of the gas up to temperature equilibrium. Located behind the entering point of the solid granular material, relative to the flow direction of the gas, is a nozzle connected to a pipe 17 by means of which water is sprayed into the hot gas flow now laden with the fine-granular solid material. The injection of the water can be effected in any suitable manner, for example with the illustrated upwardly directed spray nozzle 18. It is not absolutely necessary to convert the water into fine mist or to atomize it. It is rather sufficient to give it a fairly fine distribution as obtainable with the usual spray nozzles at water pressures in the order of about 5 to 15 atmospheres above ambient. Due to the heat exchanging effect of the solid granular material already distributed in the gas flow and already at substantially the temperature of the hot gas, the water is immediately and completely evaporated in the waste-gas conduit 4. As a result, the formation of sludge or undesired incrustation and the like is avoided.

Subsequently, the fine-granular material entered into the gas flow is separated in cyclone 5 from which it drains into the storage container 14 and is recycled to the waste-gas conduit 4. By virtue of the effective moistening of the gas flow, an intensive cooling action and a simultaneous reduction in volume of the gas flow is secured so that the dust separation in the hose-type filter 7 can take place without endangering the filter and with an especially high degree of economy. The dust separated in the hose filter 7 is discharged by means of a conveying device 19, such as a feed screw, or a pneumatic or other conveyor.

It is of particular significance in the method according to the invention that in the ordinary processing of dust-containing gases, as in the case of the embodiment just described, the amount of dust normally contained in the gas is not sufficient for the purposes of the invention. The quantity of the fine-granular solid substance additionally entered into the gas flow must be so large that, even though relatively large quantities of water are sprayed into the gas flow, an instantaneous evaporation of the water by virtue of the solid particles contained in the gas will take place. This requires that the quantity of solid substance additionally entered into the gas flow be relatively large. In practice, for example, the additionally entered quantity of solid substance is between 500 and 2000 g./Nm$^3$ in most cases.

Figure 2:
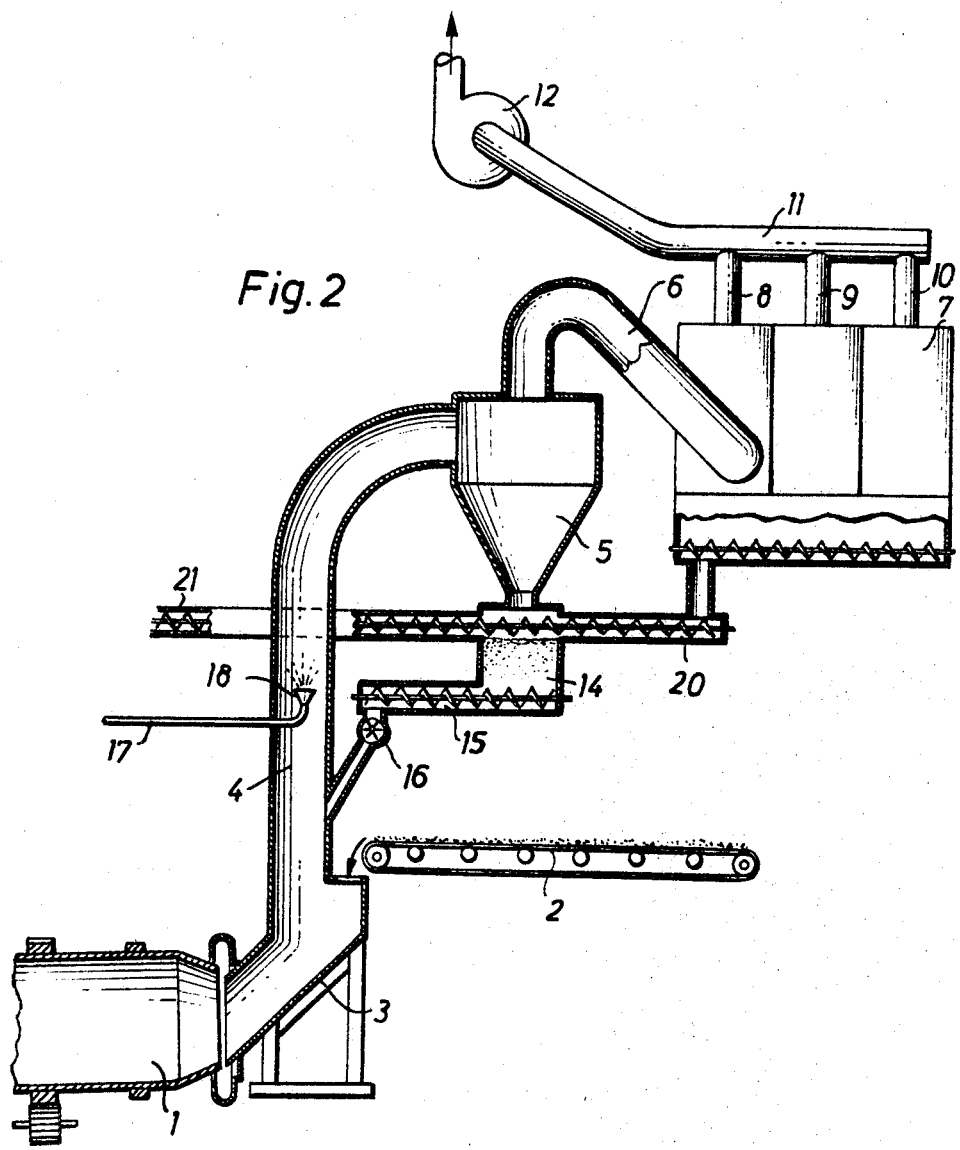
FIGS. 2 to 5 show schematically four other embodiments of respective apparatus according to the invention.

The embodiment shown in FIG. 2 constitutes a further development based upon the apparatus according to FIG. 1. The hot gas flow leaves the rotary kiln 1 through the waste-gas conduit 4, reaches the cyclone 5 and thence passes through the conduit 6 to the hose-type filter 7. Upon dust separation, the gas flow passes from the hose filter 7 through conduits 8, 9, 10 and 11 and is exhausted through a blower 12. In this embodiment, the additionally entered fine-granular substance consists of dust separated from the gas flow. For this purpose, the dust separated in the hose filter 7 is supplied by a conveyor 20, for example a feed screw, to the storage container 14 and thence through a dosage-metering feed screw 15 and a cell lock 16 into the waste-gas conduit 4. Also injected into the waste-gas conduit 4 is water by means of a supply pipe 17 and a spray nozzle 18 at the location and in the manner described above with reference to FIG. 1. Suitable means are also provided for eliminating any excessive amount of dust from the storage container 14. Thus, FIG. 2 shows an extension 21 of the feed-screw conveyor 20 which permits the container 14 to be filled only up to a given level, excess amounts of dust being discharged by the extended screw conveyor 21.

The apparatus according to FIG. 2 functions essentially as follows. At the beginning of the operation, the fine dust separated in the hose filter 7 is supplied to the storage container 14 and is entered into the hot gas flow passing through the waste-gas conduit 4. The gas flow thus enriched with dust is then charged with water injected through the pipe 17, thus being moistened and simultaneously cooled. Under the effect of the injected water, depending upon the operating conditions, agglomerations of dust particles, partly of extremely small size, may form in conduit 4. These agglomerations are then separated in cyclone 5 and returned to the storage container 14, whereas the much finer constituents, after passing through cyclone 5, are subsequently separated in the hose filter 7. As mentioned, in the illustrated embodiment only a given quantity of dust can collect in the container 14, any excess being discharged by the extension 21 of screw conveyor 20. However, it is sometimes preferable to operate in such a manner that the dust separated in the hose filter 7, after starting-up of the apparatues, is discharged separately and that thereafter only those dust particles are introduced into the waste-gas conduit 4 that are discharged from the cyclone 5.

Figure 3:
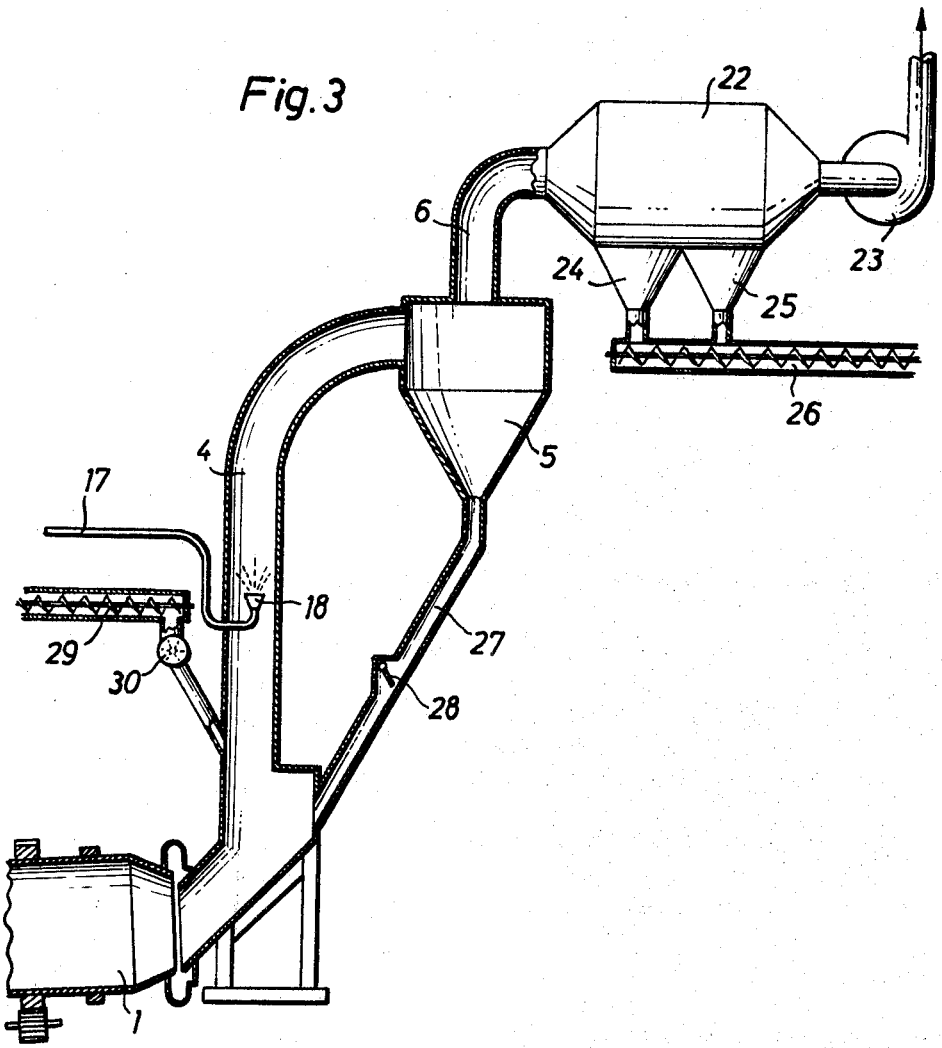

The embodiment according to FIG. 3 relates to an operation in which the raw material, preferably cement raw material, to be processed in the rotary kiln 1, is employed as the solid granular substance to be charged into the gas flow prior to humidification of the latter, and the gas flow after humidification and cooling by injected water is to be cleaned from dust in an electric precipitator 22. The raw material employed for humidifying and cooling according to the invention is supplied from a silo (not shown) through a conveyor, for example a feed screw 29 and a cell wheel 30, into the gas flow passing upwardly in the waste-gas conduit 4. The dust-laden gas flow is then humidified in the above-described manner by injection of water from a spray nozzle 18. The gas flow then passes into the cyclone 5 in which the major portion of the fine-granular solid material introduced into the gas flow and already contained therein when the gas issued from the kiln, is separated, whereas the residual solids pass with the gas from cyclone 5 through a conduit 6 to the precipitator 22. The residual dust is then removed from the gas in the precipitator, and the clean gas is exhausted by a blower 23. The separated residual dust is discharged through tapers 24, 25 and a suitable conveyor, exemplified by a feed screw 26, and again added to the raw material. For this purpose the discharged dust may be returned to the storage silo or directly passed into the kiln or into the humidifying circulation. The raw material separated in cyclone 5 passes through a conduit 27 which a pendulous flap 29 into the kiln 1. The amount of dust normally collecting on top of the flap 28 prevents the passage of kiln waste gases upwardly through the conduit 27 during starting-up of the equipment.

The apparatus has the particular advantage that the originally cold material supplied by the conveyor 29 is preheated in the humidifying circulation to an elevated temperature, for example between 100 and 300° C., thus improving the heat economy of the apparatus. This is particularly so if the entire quantity of raw material to be supplied to the kiln 1 is entered through the humidifying circulation. Then the operation affords the advantage of preheating the raw material to be processed while at the same time the large quantity of hot solid particles entrained in the ascending gas flow promotes a very rapid and effective humidification of the gas flow free of detrimental side effects. It is in some cases preferable to add to the humidifying cycle such a quantity of water that the gas temperature assumes a value above 300° C. and close to the upper limit that can be withstood by the precipitator 22 and the blower 23. As a result, the unfavorable temperature range between about 200 and 300° C. is avoided for the reasons stated above, whereas the operation at a somewhat higher temperature, for example about 350° C., at a sufficiently high humidity content, affords good results as to heat economy and dust separating action in the precipitator.

Figure 4:
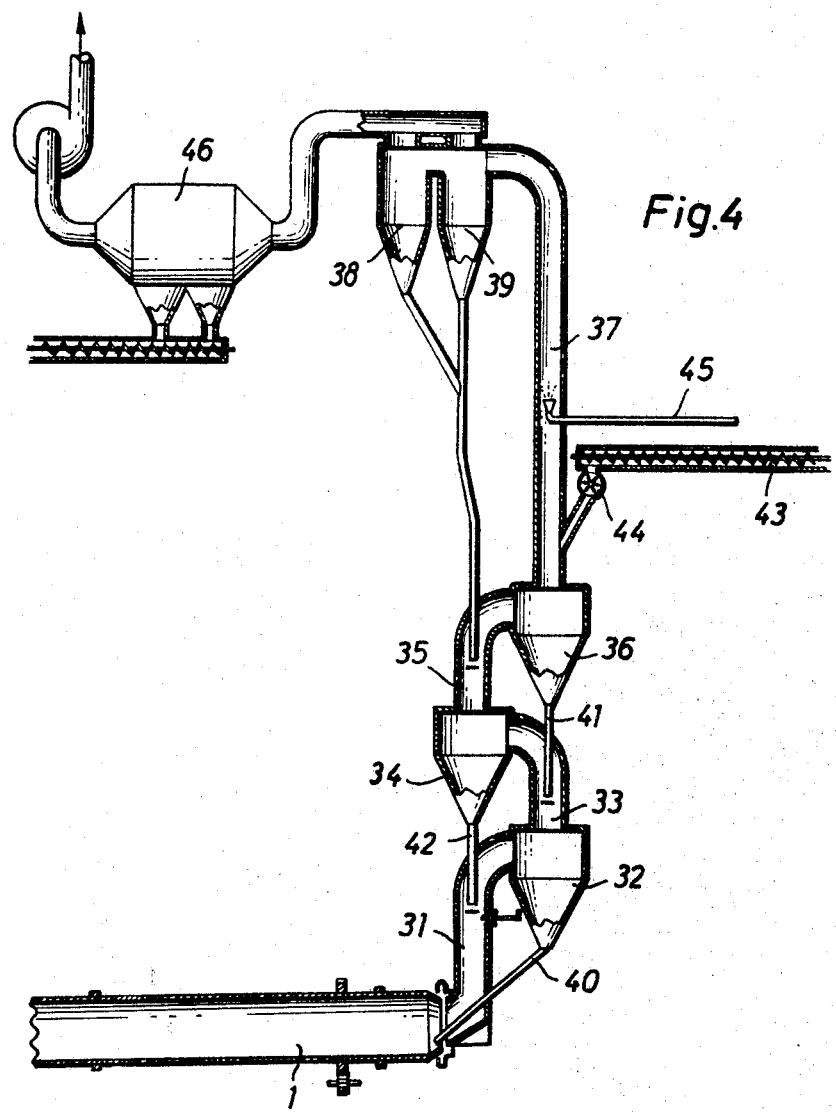

The embodiment shown in FIG. 4 constitutes a further development of the apparatus according to FIG. 3. According to FIG. 4, the hot gas flow issuing from the rotary kiln 1 passes through the waste-gas conduit 31 into a cyclone 32 from which the gas enters through a conduit 33 into a second cyclone 34 and thence through a conduit 35 into a third cyclone 36. Thereafter the gas passes through a conduit 37 and two parallel connected cyclones 38 39, to an electrostatic precipitator 46 and a blower 47 which exhausts the cleaned gas into the ambient air.

The described series connection of cyclones for heat exchanging purposes is known as such. It improves the heat economy in the preheating of fine-granular raw material by utilizing to a great extent the heat contained in the waste gases, for example in conjunction with kilns for burning cement. The series arrangement of cyclones also effects a preliminary de-acidification of the cement raw material which passes through the cyclones into the kiln. Contrary to the long rotary kilns heretofore employed in cement manufacture according to the drying method, having a calorie demand between 1200 and 1500 kcal. per kg. clinker, the heat requirements can be reduced in this manner down to about 750 kcal. per kg. clinker with relatively simple devices, particularly without movable machinery.

The cement raw material separated in the respective cyclones 34, 36 and 38, 39 is each time introduced into the one gas conduit that extends to the cyclone next preceding in the flow path of the hot gas current. From cyclone 32 the eliminated cement raw material drains through a discharged line 40 into the rotary kiln 1 in ultimately preheated condition. Analogously, the cement raw material passes into conduit 33 through a dust discharge pipe 41, and into conduit 31 through a pipe 42. The fresh cement raw material is supplied from a silo (not illustrated) by a screw-type conveyor 43 and a cell wheel 44 into the gas conduit 37.

The gas flow in the same conduit 37 is charged with a spray of water supplied by a water pipe 45. The two cyclones 38 and 39 correspond to the cyclone 5 in FIG. 3 and are connected by a dust discharge pipe with the gas conduit 35 so that the gas flow in the latter is charged with dust separated in cyclones 38 and 39. In the system illustrated in FIG. 4 it is advisable to subdivide the uppermost cyclone stage in the illustrated manner in order to obtain a better preliminary dust separation because smaller cyclones have a better separation efficiency than larger ones. Otherwise, the performance is essentially the same as in the apparatus according to FIG. 3, particularly also with respect to the dust removal in the electric precipitator 46.

Figure 5:
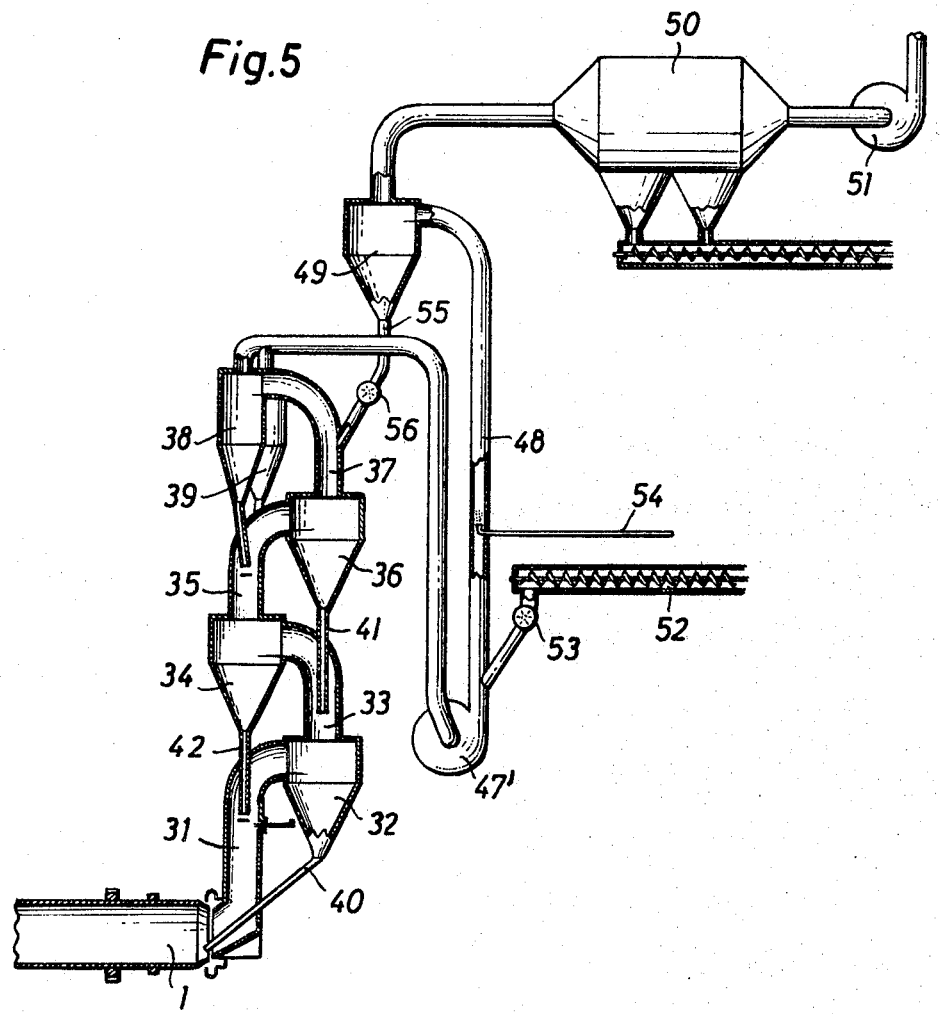

The embodiment according to FIG. 5 is equipped with a system of serially connected heat exchangers of the cyclone type substantially corresponding to that described above with reference to FIG. 4. However, according to FIG. 5 the suction side of a waste-gas blower 47' is connected to the clean-gas outlet conduits of the cyclones 38 and 39. A gas conduit 48 extends from the pressure side of the blower 47' upwardly to an additional cyclone 49 from which the waste-gas is exhausted through an electric precipitator 50 by means of a blower 51. Fine-granular raw material, such as cement raw material, is introduced into the vertical riser conduit 48 leading to the cyclone 49. This is done by means of a screw conveyor 52 and a cell wheel 53. At a somewhat higher point, water, supplied by a pipe 54, is sprayed into the ascending flow.

Under the effect of the waste gas and the already hot raw material, the water evaporates very rapidly. The dry raw material heated to about 120° C. passes from cyclone 49 through a dust discharge pipe 55 and a cell-lock wheel 56 into the gas conduit 57 of the heat exchanger system. It is preferable to mount the blower 47' on a lower platform and the cyclone 49 above the cyclone 36. As a result, the conduit 48 is sufficiently long to provide for complete evaporation of the supplied water before the gases reach the cyclone 49. It is also possible in this manner to supply the raw material separated in cyclone 49 to the cyclone stage 38, 39 only by gravity feed, as illustrated.

The invention is not limited to the illustrated and described embodiments but can be modified in various respects. Particularly a combination of the device is shown in FIGS. 4 and 5 as applicable in such a manner that humidification is effected according to FIG. 4 in conduit 37 as well as additionally in conduit 48 according to FIG. 5. The invention is further applicable not only to humidifying hot gases with water but can also be employed for example for other chemical or physical processing purposes, for example by injection of oil into a gas flow.

The invention solves particularly advantageously the problem of introducing liquids in hot gases so as to avoid undesired sludge formation and handling and to avoid sedimentation and incrustation in tube systems, dust removing problems or other problems stemming from operations with hot gas flows and difficult to master with means heretofore available.

Furthermore, it is not absolutely necessary that the injection or liquid and the subsequent evaporation of this liquid with the aid of solid substances entered into the gas flow take place in a continuously extending, vertical conduit. The liquid may also be injected in separate devices inserted into the path of the gas flow and in which the liquid droplets are whirled through with the gas flow laden with the solid particles. Such a device can be designed, for example, in accordance with known drying equipment in which the material to be dried is treated with a hot gas current while in suspension.

We claim:

1. The method of cooling and humidifying a flow of hot gas which comprises: injecting a cooling liquid in fine distribution into a flow of hot gas at a given location along the flow path thereof, introducing a fine-granular solid substance into the flow of hot gas at a location upstream of the given location, the hot gas flow having a velocity adequate for entraining the liquid and solid so that they are in heat-exchanging relation within the gas flow, separating the solid substance from the gas flow at a location along the flow path thereof downstream from the given location, recycling the separated solid substance to the gas flow and reintroducing it therein at the original introduction location thereof upstream of the given location, and electrically precipitating residual solid substance dust from the hot gas at a location further downstream of the solid substance separating location along the flow path.

2. A method according to claim 1, wherein the hot gas is waste gas issuing from a kiln, the cooling liquid is water, and the solid substance is cement raw material, the quantity of injected water being between the limits required both for complete evaporation thereof prior to reaching the location of the flow path at which the bulk of the cement raw material is separated and for maintaining at the location of electric precipitation a rated operating temperature range above 300° C.

3. An apparatus for cooling and humidifying a flow of hot gas, comprising a conduit through which a flow of hot gas passes when the apparatus is in operation, said conduit having a flow inlet end and a flow outlet end for the hot gas, liquid coolant supply means having an injection nozzle extending into said conduit intermediate said inlet and outlet ends thereof, means connected to said conduit at a location between said injection nozzle and said inlet end of said conduit for introducing fine-granular material at said location into the gas flow within said conduit, means connected to said outlet end of said conduit for separating the fine-granular material from the gas flow, and means for precipitating residual dust from the hot gas communicating with said conduit through said means for separating the fine granular material.

4. An apparatus according to claim 3, wherein said means for separating the fine-granular material has an outlet for the material and an outlet for the hot gas, and comprising a storage container connected to said material outlet for receiving separated material therein, said material introducing means connecting said container with said conduit at said location for reintroducing the material into said conduit.

5. An apparatus according to claim 4, comprising a dust-discharge connection between said precipitating means and said container for also supplying said container with dust separated in said precipitating means.

6. An apparatus according to claim 5, comprising discharge conveyor means connected to the upper portion of said storage container for limiting the contents thereof substantially to a given maximum and removing any excess of material therefrom.

7. An apparatus according to claim 5, said dust discharging connection comprising a feed-screw conveyor for passing separated material from said material separating means into said container, said conveyor passing through the upper portion of said container and having an extension projecting beyond said container, whereby the content of the container is limited to a given maximum and excess material is removed therefrom by said extension of said conveyor.

8. An apparatus according to claim 3, comprising a group of serially connected cyclone separators connected in turn to said inlet end of said conduit, and a separate cyclone separator connected to said outlet end of said conduit, each succeeding separator having a solid material outlet communicating with the next preceding separator relative to the direction of gas flow through said separators and said conduit, said separate cyclone being said means for separating the fine granular material.

9. An apparatus according to claim 8, wherein said conduit is loop-shaped and has a portion extending substantially vertically up to said separate cyclone separator.

References Cited

UNITED STATES PATENTS

| | | | |
|---|---|---|---|
| 1,315,254 | 9/1919 | Stevens | 55—1 |
| 2,015,954 | 10/1935 | Mitchell. | |
| 2,190,724 | 2/1940 | McBride. | |
| 2,631,835 | 3/1953 | Jones | 165—7 X |
| 2,769,618 | 11/1956 | Nettel | 261—95 X |
| 2,866,625 | 12/1958 | Sylvest | 165—104 X |
| 3,037,757 | 6/1962 | Deussner | 263—32 |
| 3,162,431 | 12/1964 | Muller et al. | 263—32 |

FOREIGN PATENTS 755,029   8/1956   Great Britain.

DENNIS E. TALBERT, Jr., Primary Examiner

U.S. Cl. X.R.

55—8, 10, 11, 122, 126, 135, 238, 258, 260, 262, 265, 267, 315, 343, 346, 385, 430, 447, 466, 473, 474; 263—22, 32, 53; 266—15; 110—119; 261—116, 126; 165—7, 104; 214—17, 302